July 22, 1924.

R. W. WILLSON
OPTICAL INSTRUMENT
Filed Nov. 23, 1921

1,501,979

INVENTOR
Robert W. Willson
BY Robert W Byerly
his ATTORNEY.

Patented July 22, 1924.

1,501,979

UNITED STATES PATENT OFFICE.

ROBERT W. WILLSON, OF CAMBRIDGE, MASSACHUSETTS; ARTHUR H. BROOKS ADMINISTRATOR OF SAID ROBERT W. WILLSON, DECEASED.

OPTICAL INSTRUMENT.

Application filed November 23, 1921. Serial No. 517,176.

*To all whom it may concern:*

Be it known that I, ROBERT W. WILLSON, a citizen of the United States, residing at Cambridge, in the county of Middlesex and State of Massachusetts, have invented certain new and useful Improvements in Optical Instruments, fully described and represented in the following specification and the accompanying drawings, forming a part of the same.

This invention relates to optical instruments and has for an object to provide an optical instrument which may accurately be directed upon the center of a circular or approximately circular object.

An optical instrument embodying the invention facilitates the measurements of angular distances from the center of the circular or approximately circular objects, such as the sun's disk, the full moon, or other celestial or terrestial objects of circular or nearly circular form.

While the new optical instrument is susceptible of many different uses it may most conveniently be described in connection with its use in measuring the altitude and bearing of the center of the sun's disk.

Surveyor's transits, theodolites, altazimuths, and other instruments heretofore customarily used in measuring these coordinates are provided with telescopes which produce an image of the sun's disk in the form of a circle of comparatively large diameter and containing nothing to indicate its center. To obtain altitude and bearing readings from the sun by means of such instruments it is necessary to set the instrument so that the circular image of the sun's disk is tangential to one of the two cross wires or hairs of the instrument. To obtain both altitude and horizontal bearing readings, therefore, two settings upon the sun must be made and each reading must be corrected for the semi-diameter of the sun's disk at the time the observation is taken.

An instrument constructed in accordance with the present invention produces an image of the sun which is circular or approximately so and which contains at its center a minute spot which is either brighter or darker than the rest of the image. If the instrument is provided with the usual cross wires, the central spot of the image may accurately be set at the intersection of the cross wires. The instrument will then be directed accurately at the center of the solar disk. By a single setting of the instrument upon the sun, therefore, both altitude and horizontal bearing readings may be obtained, and neither of the readings will require correction for the sun's semi-diameter.

An optical instrument embodying the invention includes an optical element comprising a convex lens, which may be similar to the object glass of the telescope of a surveyor's transit, and a conical prism in front of the lens and coaxial therewith. The instrument is most desirably also provided with an eye-piece of any usual construction and with cross wires or hairs such as are used in a surveyor's transit and in other types of telescopes. The wedge angle of the conical prism is so proportioned to the index of refraction of the glass of which the prism is made that light striking the prism in a direction parallel to its axis is deflected at an angle which is approximately equal to the apparent semi-diameter of the sun's disk or the semi-diameter of any other circular or approximately circular object upon which the instrument is to be directed.

In the accompanying drawings, I have, for the sake of illustration, shown the invention embodied in a telescope of the type customarily used in a surveyor's transit. In the drawings:—

Figure 1:
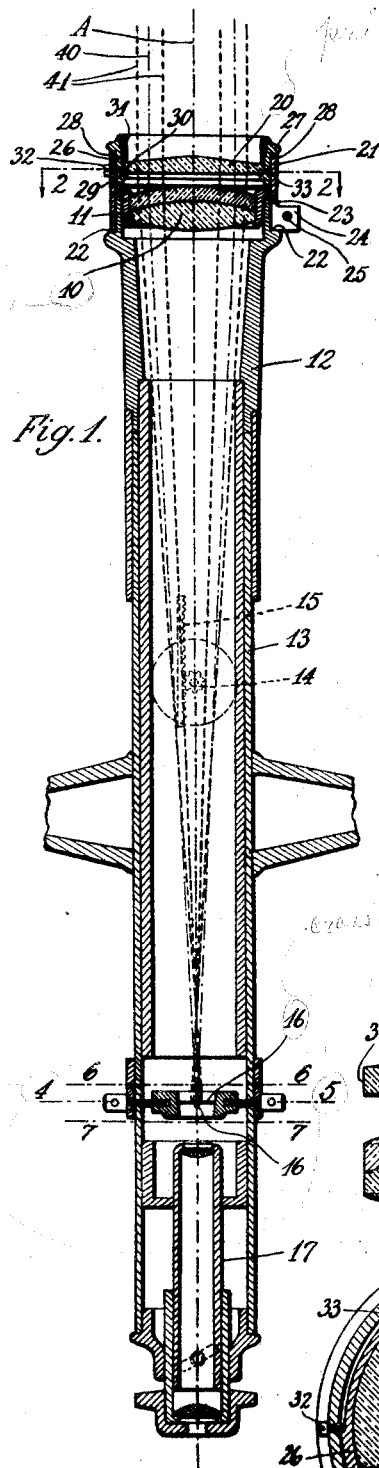
Fig. 1 is a longitudinal section of the instrument.

In the form shown in the drawings the new instrument is like the telescope customarily used in the surveyor's transit except that a conical prism is removably mounted in front of the object glass of the telescope.

The object glass 10, a convex lens, is mounted in a setting 11 at the outer end of the object glass tube 12 which is slidably mounted in the telescope tube 13. The object glass tube may be moved longitudinally with respect to the telescope tube by means of a pinion 14 and a rack 15. In the telescope tube are mounted cross wires 16 which intersect in the axis A of the object glass, and an eye-piece 17 which may be focused upon the plane of the cross wires. It may be noted that the expression "cross wires" as used in this application, including the claims, is to be understood in a general sense, and not as a limitation upon the material from which the cross wires are made. This material may be metal, hair, spider web, or any other material usable for this purpose. As the features just described are commonly used in the telescopes of surveyors' transits and are well understood, they are not described in detail. It will be understood also that the telescope may be provided with a mounting which permits it to be turned in horizontal and vertical planes, and that its mounting may be provided, as is customary, with a level, a compass, and with scales by which readings of the bearing and altitude of an object upon which the telescope is directed may be taken.

Figure 2:
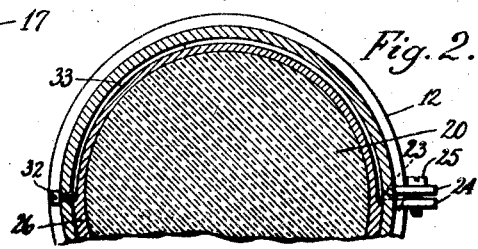
Fig. 2 is a transverse section on the line 2—2 of Fig. 1 on a larger scale.

A conical prism 20 is removably mounted in front of the object glass 10. For this purpose a short tube or ring 21 is mounted upon the outer end of the object glass tube 12. The inner edge of the ring 21 sets against the shoulder 22, which is customarily provided upon the object glass tube 12. The ring 21 contains a longitudinal slot 23 near its inner end so that the ring may be clamped upon the object glass tube 12 by means of a screw 25 passing through a split lug 24 as best seen in Fig. 2. The setting of the prism 20 comprises an outer member 26 which has a smooth running fit in the outer portion of the ring 21, and an inner member 31 which is screwed into the outer member 26. The prism 20 is held between an internal annular flange 29 formed on the outer member 26 of the setting and the lower edge of the inner member 31 of the setting. The outer member 26 has at its outer end an external flange 27 which has a smooth surface 28 which contacts with the outer end of the ring 21. In the outer surface of the outer member 26 of the setting is formed a groove 33 into which enters the end of a screw 32 carried by the ring 21. The engagement between the groove 33 and the screw 32 retains the setting in the ring 21, but permits the setting to be turned through an angle of 180° (see Fig. 2).

The mounting described is designed to retain the prism 20 with its axis coincident with the axis A of the object glass. The provision for turning the prism through 180° permits the correction of errors which may arise by slight inaccuracies in forming the prism or the mounting so that the prism axis is not exactly coincident with that of the lens.

Figure 3:
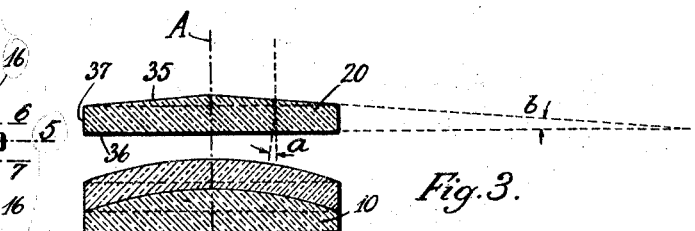
Fig. 3 is a sectional diagrammatic view upon an enlarged scale, showing the prism and the object glass.

As best seen in Fig. 3, the prism 20 has a conical surface 35. The opposite or base surface 36 of the prism is a plane surface perpendicular to the axis of the conical surface. For convenience in mounting, the conical surface 35 is not extended until it meets the base surface 36 of the prism, but is cut off so that a cylindrical peripheral surface 37 is provided. In order that the prism may be accurately mounted it is important that the periphery of the base surface 36 lie in a plane perpendicular to the axis of the conical surface 35. It is not essential, however, that the entire base surface 36 lie in this plane as a base surface may if desired be made spherically curved as hereinafter pointed out.

It is apparent that rays of light striking the prism shown in Fig. 3 in a direction parallel to the axis of the prism will be deflected toward the axis as they pass through the prism. The angle $a$ of deflection of such rays, which may be called the angle of deviation of the prism, depends upon the index of refraction of the glass, or other material of which the prism is made, and the "wedge angle" of the prism. The wedge angle $b$ is the angle between the conical surface 35 and a plane perpendicular to the axis of this surface. The relation between the angle of deflection or deviation $a$ and the wedge angle $b$ may be computed by known methods. When the angles are both small, this relation may for practical purposes be obtained from the following formula $$a = (n-1) \times b$$

where $n$ represents the index of refraction of the material of the prism and $b$ the wedge angle of the prism.

For a reason hereinafter explained, the wedge angle $b$ of the prism is so proportioned to the index of refraction of the material of the prism that the angle of deviation $a$ is approximately equal to the apparent semi-diameter of the circular object upon the center of which the instrument is to be set.

The particular instrument shown in the drawings is designed to be set upon the center of the sun's disk and the prism is so proportioned that the angle of deviation $a$ equals the mean semi-diameter of the sun's disk or 0° 16′ 2″. With glass of an index of refraction of 1.523 this angle of deviation is obtained by making the wedge angle $b$ of the prism 0° 30′ 39.4″. For the sake of clearness, however, the size of the wedge angle $b$ is considerably exaggerated in the drawings.

Figure 4:
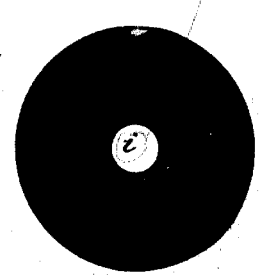
Fig. 4 is a magnified view of the image of a circular object formed by the object glass, without the prism, in the plane of the focus of the object glass which is indicated by the line 4—5 in Fig. 1.

The operation of the instrument described is as follows:—It will be understood that if the prism is removed and the telescope directed toward the sun the rays of the sun which are substantially parallel when they strike the object glass 10 of the telescope will be brought together so as to form an image of the sun at the focus of the object glass. Such rays are indicated by the dot-and-dash lines 40 in Fig. 1. The plane of the focus is represented by the line 4—5 in Fig. 1. The focal plane is there shown as the plane in which the cross wires 16 are mounted in the telescope. By moving the object glass tube inwardly or outwardly by means of the gear 14 and rack 15, however, the focal plane 4—5 may be offset in either direction from the plane of the crosss wires 16. The image $i$ of the sun formed in the focal plane by the object glass alone is shown in Fig. 4. It consists simply of a circle of fairly large diameter containing nothing to indicate the center of the circle. If the focal length of the object glass is 8 inches, the diameter of the image shown in Fig. 3 will be about 0.07 inch, although it will, of course, appear much larger when viewed through the eye-piece of the telescope.

Figure 5:
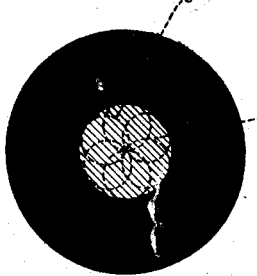
Fig. 5 is a magnified view of the image of a circular object having a semi-diameter equal to the angle of deviation of the prism, formed by the prism and object glass in the plane of the focus of the object glass which is indicated by the line 4—5 in Fig. 1.

With the prism 20 in the position indicated in Fig. 1 it is apparent that when the instrument is directed at the sun the rays of the sun (indicated by the dotted lines 41 in Fig. 1) which are parallel when they strike the prism 20 will be deflected inwardly so that they are convergent when they strike the object glass 10. If the angle of deviation of the prism is precisely equal to the semi-diameter of the sun at the time of the observation, the image of the sun formed in the focal plane 4—5 of the lens will have the appearance of a circle of twice the diameter of the image formed by the lens alone. This image I, shown in Fig. 5, is really a composite image formed by the superposition of an infinite number of circular images of the same size as the image $i$ shown in Fig. 4, and displaced from the center of the composite image by a distance equal to their semi-diameters. Some of the component images are indicated by the dotted lines $i'$ in Fig. 5, although it should, of course, be understood that these component images are not seen separately.

Figure 6:
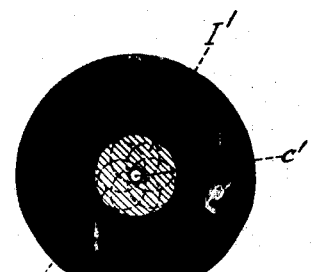
Fig. 6 is a magnified view of the image of a circular object having a semi-diameter equal to the angle of deviation of the prism, formed by the prism and object glass on a plane slightly within the focus of the object glass, which is indicated by the line 6—6 in Fig. 1.

The image I′ formed by the lens and prism upon a plane 6—6 slightly within the focus of the object glass has the form illustrated in Fig. 6. This image I′, like that shown in Fig. 4, is really a composite image formed by the superposition of an infinite number of component circular images $i'$ of substantially the same diameter as the image $i$ shown in Fig. 4, but in this instance the component images $i'$ are displaced from the center of the composite image by distances slightly less than their semi-diameters, so that the component images overlap slightly at the center of the composite image. As the result, the composite image I′ shown in Fig. 6 appears as a circle of slightly less than twice the diameter of the image $i$ shown in Fig. 4 and having at its center a minute bright spot C.

Figure 7:
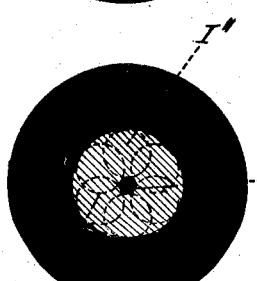
Fig. 7 is a magnified view of the image of a circular object having a semi-diameter equal to the angle of deviation of the prism, formed by the prism and object glass in a plane slightly without the focus of the object glass, represented by the line 7—7 in Fig. 1.

The image I″ formed by the prism and object glass in a plane 7—7 just without the focal plane of the object glass has the form illustrated in Fig. 7. In this case the component circular images $i'$ are displaced from the center of the composite image by a distance slightly greater than their semi-diameters. As a result, the composite image I″ appears as a circle of slightly more than twice the diameter than the image $i$ shown in Fig. 4 and having at its center a minute black spot C′.

It will be understood that an image like that shown in Fig. 6 is formed in the focal plane of the object glass if the angle of deviation of the prism is slightly greater than the semi-diameter of the sun at the time of the observation, and that an image like that shown in Fig. 7 is formed in the focal plane if the angle of deviation of the prism is slightly less than the semi-diameter of the sun at the time of the observation. Owing, however, to the seasonal variation in the diameter of the sun's disk, due to the variation in the distance between the earth and the sun, it has been found most convenient to make the angle of deviation of the prism precisely equal to the mean semi-diameter of the sun and to obtain the bright or dark spot at the center of the image by observing the image on the plane displaced from the focal plane when the semi-diameter of the sun at the time of the observation is just equal to its mean semi-diameter.

The eye-piece of the telescope may be focused upon the plane of the cross wires 16 so that the image which is observed through the eye-piece is that formed in the plane of the cross wires. By moving the object glass tube inwardly or outwardly, the focal plane of the object glass may be shifted with respect to the eye-piece and the cross wires so that the plane of the image observed may be either within or without the focal plane.

It is, therefore, a very simple matter to set the instrument accurately upon the center of the sun. To do this it is merely necessary to focus the eye-piece upon the plane of the cross wires, direct the instrument toward the sun, and then move the object glass tube inwardly or outwardly by means of the pinion 14 until the image observed contains a minute bright or dark central spot. The telescope is then turned until this spot lies at the intersection of the cross-wires 16. This indicates that the axis of the telescope is pointed directly at the center of the sun. If the telescope is mounted in the manner customary in surveyor's transits, the altitude and bearing of the sun may then be read off at once and no correction for the semi-diameter of the sun need be applied to these readings.

When very accurate results are required, it is desirable to eliminate any slight error which may result from slight inaccuracy in the making of the prism. In order to eliminate errors from this cause it is merely necessary to take an observation with the prism setting 26, 31 turned so that one end of the groove 33 is in engagement with the screw 32, and another observation with the prism setting 26, 31 turned so that the other end of the groove 33 is in engagement with the screw 32. As the prism is turned through an angle of 180° between the two observations any error caused by inaccuracy in the positioning of the prism axis in the first observation will be exactly reversed in the second observation, so that the true position of the sun may be ascertained by merely taking the mean between the results of the two observations.

In what has been said it has been assumed that the solar disk observed is truly circular. The instrument may, however, be used in substantially the same manner when the sun's disk appears somewhat elliptical because of atmospheric refraction. In this case the images I', and I'' will be elliptical and the component images i' will be ellipses, instead of circles, and in consequence the central spot C or C' will be elongated instead of round. By observing the image in the proper planes, however, the central spots may be made so small that they appear practically as points and so may be accurately set at the intersection of the cross hairs.

When it is desired to take observations upon objects other than the sun, the prism 20 and its mounting may readily be removed by loosening the screw 25 and slipping the ring 21 off the end of the object glass tube 12.

Many modifications may be made in the device described without departing from my invention. Thus when the base of the prism is made flat as shown in Figs. 1 and 3, the prism may if desired be located with its flat side turned outward. The illustrated mounting of the prism may be changed, and in case the prism is made with great accuracy, or in case very accurate readings are not required, provision for turning the prism through an angle of 180° is not necessary. I shall not, however, attempt to catalogue all changes which may be made in the embodiment described without departing from my invention, but I will mention a number of changes which in themselves constitute part of my invention and which serve to adapt the instrument to various different uses.

When the conical surface of the prism is placed outward it is not essential that a base surface of the prism be a plane surface, and it may desirably under certain circumstances be made spherically curved. I have found that when the prism is used in combination with an object glass of very high power it is desirable to make the base surface of a prism slightly concave so that the prism has the form illustrated in Fig. 8. This has the effect of producing a sharper image in the focal plane of the object glass. The desirable curvature of the base surface is, however, somewhat exaggerated in Fig. 8 for the sake of clearness.

Figure 8:
Fig. 8 is a sectional view of a modified form of prism.
Figure 9:
Fig. 9 is a sectional view showing the modification in which the prism and lens are formed from a single piece of glass.

Futhermore, in the case of an instrument which is to be used only for solar observations an ordinary object glass may be dispensed with and the base surface of the prism made convex as illustrated in Fig. 8, so that a single piece of glass, or, if preferred, a plurality of pieces of glass secured together without air spaces between them may be made to perform the function of both the prism and the object glass in the specific instrument described. It should be understood that in the claims which follow the mention of a lens and a conical prism is intended to include a lens and prism formed of a single piece of glass as shown in Fig. 8, as well as a separate lens and prism, except in such instances as a prism separate from the lens is expressly specified.

For obtaining altitude and bearing, readings upon the moon, or other circular or approximately circular object, a prism may be provided which has an angle of deviation approximately equal to the semi-diameter of the moon or other object to be observed.

I claim as my invention:

1. An optical instrument, comprising a tube containing cross wires, and an optical element mounted at the outer end of the tube and formed to deflect parallel rays from a circular object so as to produce in the plane of the cross wires a circular image with a spot at its center having a different degree of illumination from the rest of the image.

2. An optical instrument, comprising a tube, an optical element mounted at the outer end of said tube and comprising a convex lens and a prism having a conical surface whose axis is substantially coincident with the axis of the lens, and cross wires in said tube intersecting in the axis of the optical element.

3. An optical element, comprising a convex lens and a prism having a conical surface whose axis is substantially coincident with the axis of the lens.

4. An optical element, comprising a convex lens and a prism separate from the lens and having a conical surface, the prism being mounted in front of the lens and with its axis substantially coincident with that of the lens.

5. In an optical instrument adapted to be set upon the center of a circular object, an optical element comprising a convex lens and a prism having a conical surface substantially coaxial with the lens, the prism having an angle of deviation approximately equal to the apparent semi-diameter of the object to be observed.

6. In an optical instrument adapted to be set upon the center of the sun's disk, an optical element comprising a convex lens and a prism having a conical surface substantially coaxial with the lens, the prism having an angle of deviation approximately equal to the semi-diameter of the sun.

7. An optical instrument adapted to be set upon the center of the sun's disk, comprising a convex lens, a prism having a conical surface substantially coaxial with said lens and having an angle of deviation equal to the mean semi-diameter of the sun, and means for observing the image of the sun formed by said prism and lens in the focal plane of the lens and in planes displaced from the focal plane of the lens.

8. An optical instrument adapted to be set upon the center of the sun's disk, comprising a telescope tube containing cross wires, means for observing an image formed in the plane of said cross wires, a convex object glass located with its axis passing through the point of intersection of said cross wires, a separate conical prism substantially coaxial with said object glass and having an angle of deviation equal to the mean semi-diameter of the sun; and means for moving said object glass axially so as to locate the focal plane of the object glass in the plane of said cross-wires and to displace the focal plane from the plane of said cross wires.

9. In combination with the telescope of a surveyor's transit or similar instrument, a conical prism secured in front of the object glass of a telescope with its axis substantially coincident with that of the object glass.

10. An attachment for the telescopes of surveyor's transits and like instruments, comprising a conical prism having an angle of deviation approximately equal to the semi-diameter of the sun, and a setting for said prism removably secured to the telescope and arranged to position the prism in front of the object glass of the telescope with its axis substantially coincident with that of the object glass.

11. In combination with a telescope of a surveyor's transit or similar instrument, a prism secured in front of the object glass of the telescope having an outer conical surface whose axis is substantially coincident with that of the object glass, and an inner base surface which is concave, spherically curved and coaxial with the object glass.

12. An optical instrument adapted to be set upon the center of the circular object, comprising a tube, a convex lens mounted near the outer end thereof, a separate conical prism, and a mounting for said prism arranged to hold it in front of said lens with its axis substantially coincident therewith, said mounting of said prism being adapted to permit the turning of the prism through an angle of 180°.

13. An attachment for the telescopes of surveyors' transits and like instruments, comprising a conical prism, a setting for said conical prism, a ring in which said setting is turnably mounted, said setting and ring having cooperating stops adapted to locate the prism setting in two positions separated by an angle of 180°, and means for removably securing said ring to the outer end of the telescope.

In testimony whereof I have hereunto set my hand in the presence of two subscribing witnesses.

ROBERT W. WILLSON.

Witnesses:
A. MEAD WHEELER,
E. WILLARD REIPPEN.